(12) United States Patent
Tani et al.

(10) Patent No.: US 9,253,431 B2
(45) Date of Patent: Feb. 2, 2016

(54) PROJECTION VIDEO DISPLAY APPARATUS

(71) Applicant: Panasonic Intellectual Property Management Co., Ltd., Osaka-shi, Osaka (JP)

(72) Inventors: Kazuma Tani, Osaka (JP); Ken Mashitani, Osaka (JP); Takaaki Gyoten, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/645,032

(22) Filed: Mar. 11, 2015

(65) Prior Publication Data
US 2015/0264291 A1   Sep. 17, 2015

(30) Foreign Application Priority Data

Mar. 17, 2014 (JP) ................................ 2014-053068
Feb. 19, 2015 (JP) ................................ 2015-030465

(51) Int. Cl.
*H04N 5/74* (2006.01)
*H04N 9/31* (2006.01)

(52) U.S. Cl.
CPC .............. *H04N 5/7475* (2013.01); *H04N 5/74* (2013.01); *H04N 9/3144* (2013.01)

(58) Field of Classification Search
CPC ..... H04N 5/7475; H04N 5/74; H04N 5/7441; H04N 5/7458; H04N 9/31; H04N 9/3141; H04N 9/3197; H04N 9/3129; H04N 9/3144; H04N 9/3105; H04N 2005/745; G02B 7/008

USPC ........................ 348/748, 744, 750, 755, 758; 353/57–61
IPC .................................................. H04N 5/74,9/31
See application file for complete search history.

(56) References Cited

U.S. PATENT DOCUMENTS

| | | | | |
|---|---|---|---|---|
| 5,822,022 A | * | 10/1998 | Deter | ...................... H04N 5/74 348/750 |
| 8,317,336 B2 | * | 11/2012 | Noda | ..................... G03B 21/16 348/748 |
| 2002/0196377 A1 | * | 12/2002 | Furukawa | ............ H04N 9/3129 348/742 |
| 2015/0029234 A1 | * | 1/2015 | Ishizu | .................. H04N 9/3155 345/690 |

FOREIGN PATENT DOCUMENTS

JP            2005-227334            8/2005

* cited by examiner

*Primary Examiner* — Sherrie Hsia
(74) *Attorney, Agent, or Firm* — Hamre, Schumann, Mueller & Larson, P.C.

(57) ABSTRACT

A projection video display apparatus includes: a converter that converts an input video signal having a first number of pixels and a first frame rate into a conversion video signal having a second number of pixels and a second frame rate, the second number of pixels being smaller than the first number of pixels, and the second frame rate being an n-th multiple (n is an integer of 2 or greater) of the first frame rate; an optical element that displaces an optical axis of the video light beam; an optical element driving unit that drives the optical element at a frequency F being a natural-number multiple of the first frame rate; and a rotating body that rotates at a rotation speed R. The rotation speed R is set so as to become a value within a predetermined range corresponding to the frequency F.

4 Claims, 12 Drawing Sheets

FIG. 8

| | 0 | 1 | 2 | 3 |
|---|---|---|---|---|
| 5 | 220 | 320 | 221 | 321 |
| 4 | 120 | 420 | 121 | 421 |
| 3 | 210 | 310 | 211 | 311 |
| 2 | 110 | 410 | 111 | 411 |
| 1 | 200 | 300 | 201 | 301 |
| 0 | 100 | 400 | 101 | 401 |

Column number →

3840 pixels

Line number →

2160 pixels

US 9,253,431 B2

PROJECTION VIDEO DISPLAY APPARATUS

BACKGROUND

1. Technical Field

The present disclosure relates to a projection video display apparatus such as a projector.

2. Description of the Related Art

PTL 1 discloses a projection video display apparatus including an optical path changing unit and a driving unit, which moves the optical path changing unit, between a rear lens group and a front lens group. The optical path changing unit shifts an optical path of a video light beam toward a direction perpendicular to an optical axis, which allows projection of a video image having resolution higher than that of a video image generated by a light bulb.

CITATION LIST

Patent Literature

PTL 1: Unexamined Japanese Patent Publication No. 2005-227334

SUMMARY

The present disclosure provides a projection video display apparatus that effectively maintains quality of a projection image video.

According to one aspect of the present disclosure, a projection video display apparatus includes: a converter that converts an input video signal having a first number of pixels and a first frame rate (frames per second) into a conversion video signal having a second number of pixels and a second frame rate (frames per second), the second number of pixels being smaller than the first number of pixels, and the second frame rate being an n-th multiple (n is an integer of 2 or greater) of the first frame rate; a light source; a light bulb that modulates a light beam emitted from the light source based on the conversion video signal and outputs a video light beam; an optical element that displaces an optical axis of the video light beam output from the light bulb; an optical element driving unit that drives the optical element at a frequency F (Hz) based on timing of displaying the conversion video signal, the frequency F being a natural-number multiple of the first frame rate; a projection optical system that projects the video light beam displaced by the optical element to a projection surface; and a rotating body that rotates at a rotation speed R (rotations per second). The rotation speed R is set so as to become a value within a predetermined range corresponding to the frequency F.

The projection video display apparatus of the present disclosure effectively maintains the quality of the projection image video.

BRIEF DESCRIPTION OF DRAWINGS

FIG. 8 is a schematic diagram illustrating a base video signal;

DETAILED DESCRIPTION OF THE PREFERRED EMBODIMENTS

Hereinafter, an exemplary embodiment will be described in detail with reference to the drawings. However, the detailed description beyond necessity is occasionally omitted. For example, the detailed description of the well-known item or the overlapping description of the substantially same configuration is occasionally omitted. This is because unnecessary redundancy of the following description is avoided for the purpose of the easy understanding of those skilled in the art.

The accompanying drawings and the following description are provided in order that those skilled in the art sufficiently understand the present disclosure, but the claims are not limited to the accompanying drawings and the following description.

First Exemplary Embodiment

A first exemplary embodiment will be described below with reference to FIGS. 1 to 12.

[1-1. Configuration]

[1-1-1. Entire Configuration]

Figure 1:
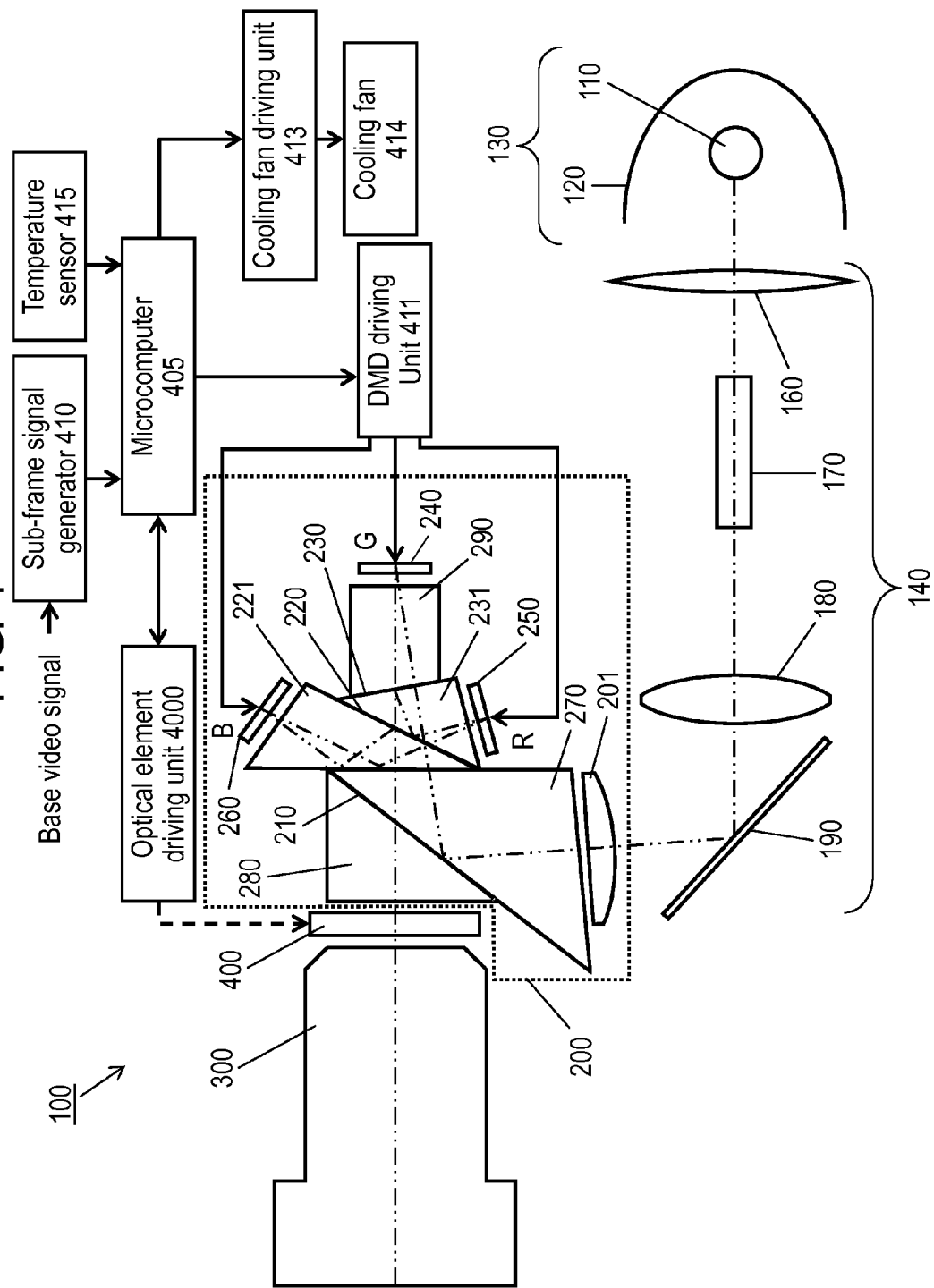
FIG. 1 is a view illustrating an entire configuration of a projector according to a first exemplary embodiment.

FIG. 1 is a view illustrating an entire configuration of projector 100 according to the first exemplary embodiment. Projector 100 includes light source 130, lighting optical system 140, video generator 200, plane parallel glass 400, and projection optical system 300.

Light source 130 includes luminous tube 110 and reflector 120 that reflects a white light beam emitted from luminous tube 110. Luminous tube 110 emits a white light flux including a red light beam, a green light beam, and a blue light beam, which have different wavelength ranges. For example, luminous tube 110 is constructed with an ultrahigh pressure mercury lamp or a metal halide lamp. Reflector 120 reflects the light flux, which is emitted from luminous tube 110 arranged at one focal position, and outputs a parallel light beam forward.

The white light beam emitted from light source 130 is input to lighting optical system 140. Lighting optical system 140 guides the light flux from light source 130 to video generator 200. Lighting optical system 140 includes lens 160, rod 170, lens 180, and mirror 190. Lighting optical system 140 guides the light flux emitted from light source 130 to video generator 200 including Digital Mirror Devices (hereinafter referred to as DMDs) 240, 250, and 260. Rod 170 is a columnar glass member that totally reflects the light beam therein. The light flux emitted from light source 130 is reflected a plurality of times in rod 170. Therefore, a light intensity distribution becomes substantially homogeneous at an outgoing surface of rod 170.

Lens 180 is a relay lens that guides the light flux exiting from the outgoing surface of rod 170 to DMDs 240, 250, and 260. Mirror 190 reflects the light flux exiting from lens 180 toward video generator 200.

Based on an externally-input video signal (to be described later), video generator 200 modulates the light flux incident from lighting optical system 140, and outputs a video light beam. Video generator 200 includes field lens 201, prism block, and DMDs 240, 250, and 260.

Field lens 201 guides the light beam incident from lighting optical system 140 to the prism block. The light flux transmitted through field lens 201 is incident on the prism block.

The prism block includes a total reflection prism and a color prism. The total reflection prism is constructed with prism 270 and prism 280. Air layer 210 exists in a proximity surface between prism 270 and prism 280. Air layer 210 is thin. Air layer 210 totally reflects the light flux that is incident at a critical angle or greater. The light flux incident from field lens 201 is incident on a boundary surface between prism 270 and air layer 210 at the critical angle or greater. Accordingly, the light flux is totally reflected by the boundary surface. The totally-reflected light flux is incident on the color prism.

The color prism is constructed with prism 221, prism 231, and prism 290. Dichroic film 220 that reflects a blue light beam is provided in the proximity surface between prism 221 and prism 231. Dichroic film 230 that reflects a red light beam is provided in the proximity surface between prism 231 and prism 290. The blue light beam reflected by the proximity surface between prism 221 and prism 231 exits from the outgoing surface of prism 221. The red light beam reflected by the proximity surface between prism 231 and prism 290 exits from the outgoing surface of prism 231. A green light beam that is the light flux transmitted through both the proximity surfaces exits from the outgoing surface of prism 290.

DMDs 240, 250, and 260 are arranged on the outgoing surface side of each prism constituting the color prism. DMD 260 is arranged on the outgoing surface side of prism 221. DMD 250 is arranged on the outgoing surface side of prism 231. DMD 240 is arranged on the outgoing surface side of prism 290.

Each of DMDs 240, 250, and 260 includes a 1920-by-1080 micro-mirror. Each of DMDs 240, 250, and 260 deflects the micro-mirror according to the video signal. DMDs 240, 250, and 260 separate the light beam incident on projection optical system 300 from the light beam reflected out of an effective range of projection optical system 300 according to the video signal, thereby modulating the light beam incident on each of DMDs 240, 250, and 260. The green light beam is incident on DMD 240. The red light beam is incident on DMD 250. The blue light beam is incident on DMD 260. DMDs 240, 250, and 260 are an example of the light bulb.

In the light fluxes reflected by DMDs 240, 250, and 260, the light fluxes incident on projection optical system 300 are combined into one light flux again by the color prism at a preceding stage of projection optical system 300. The combined light flux is incident on the total reflection prism. The light flux incident on the total reflection prism is incident on air layer 210 at the critical angle or less. Accordingly, the light flux is transmitted through air layer 210 and plane parallel glass 400, and incident on projection optical system 300.

Plane parallel glass 400 is an optical element that is arranged between the prism block and projection optical system 300. Plane parallel glass 400 is arranged such that an orientation of a plate portion of plane parallel glass 400 can be changed within a predetermined angle range around a direction perpendicular to an optical axis of projection optical system 300. An optical element driving device that drives plane parallel glass 400 is described later.

Projection optical system 300 is an optical system that magnifies the incident light flux. Projection optical system 300 has a focus function and a zoom function, and projects the video light beam from DMDs 240, 250, and 260 to a projection surface to show the video image on the projection surface.

As illustrated in FIG. 1, projector 100 also includes microcomputer 405, sub-frame signal generator 410, DMD driving unit 411, cooling fan driving unit 413, cooling fan 414, temperature sensor 415, and optical element driving unit 4000.

Sub-frame signal generator 410 generates a sub-frame video signal from an externally-input base video signal.

The base video signal is what is called a 4K2K video signal having 3840 pixels in a horizontal direction and 2160 pixels in a vertical direction. The base video signal has a frame rate of 60 frame/s (60 Hz). The sub-frame video signal is a video signal having 1920 pixels in the horizontal direction and 1080 pixels in the vertical direction. The sub-frame video signal has a frame rate of 240 frame/s (240 Hz). A number of pixels of the sub-frame video signal is a quarter of that of the base video signal. The frame rate of the sub-frame video signal is four times that of the base video signal. Sub-frame signal generator 410 is an example of the converter. A specific operation of sub-frame signal generator 410 is described later.

Microcomputer 405 totally controls each unit of projector 100. Based on the sub-frame video signal, microcomputer 405 controls DMD driving unit 411, and causes DMD driving unit 411 to generate the video light beam. DMD driving unit 411 controls deflections of the micro-mirrors of DMDs 240, 250, and 260 in synchronization with the sub-frame video signal and a synchronization signal of the sub-frame video signal. Therefore, DMD driving unit 411 causes each of DMDs 240, 250, and 260 to form the video light beam based on the video signal from each color light beam dispersed by the color prism.

In synchronization with timing of generating the video light beam based on the sub-frame video signal, microcomputer 405 controls optical element driving unit 4000 to deviate (shift) a projection position of the video light beam generated by each of DMDs 240, 250, and 260. Under the control of microcomputer 405, optical element driving unit 4000 drives plane parallel glass 400 to deviate the projection position of the video light beam. In projector 100, plane parallel glass 400 is operated to deviate a display position on the projection surface (screen) of pixels constituting the video image generated by each of DMDs 240, 250, and 260 at intervals of a pixel pitch or less. Therefore, projector 100 can project the video image having resolution higher than that of each of DMDs 240, 250, and 260.

Temperature sensor 415 is arranged in a chassis of projector 100. Temperature sensor 415 detects a temperature in the chassis, and informs microcomputer 405 of temperature information.

Based on the temperature information input from temperature sensor 415, microcomputer 405 fixes a rotation speed R of cooling fan 414, and issues an instruction of the rotation speed R to cooling fan driving unit 413. Cooling fan driving unit 413 drives cooling fan 414 in order to rotate cooling fan 414 at the instructed rotation speed R. Cooling fan 414 is an example of the rotating body.

Microcomputer 405 controls the rotation speed R of cooling fan 414 and driving frequency F of plane parallel glass 400 such that a relationship between them satisfies a predetermined condition. The rotation speed R of cooling fan 414 and driving frequency F of plane parallel glass 400, which are controlled by microcomputer 405, are described later.

[1-1-2. Configuration of Optical Element Driving Unit]

Optical element driving unit 4000 that drives plane parallel glass 400, which is the optical element arranged between the prism block and projection optical system 300, will be described below.

Figure 2:
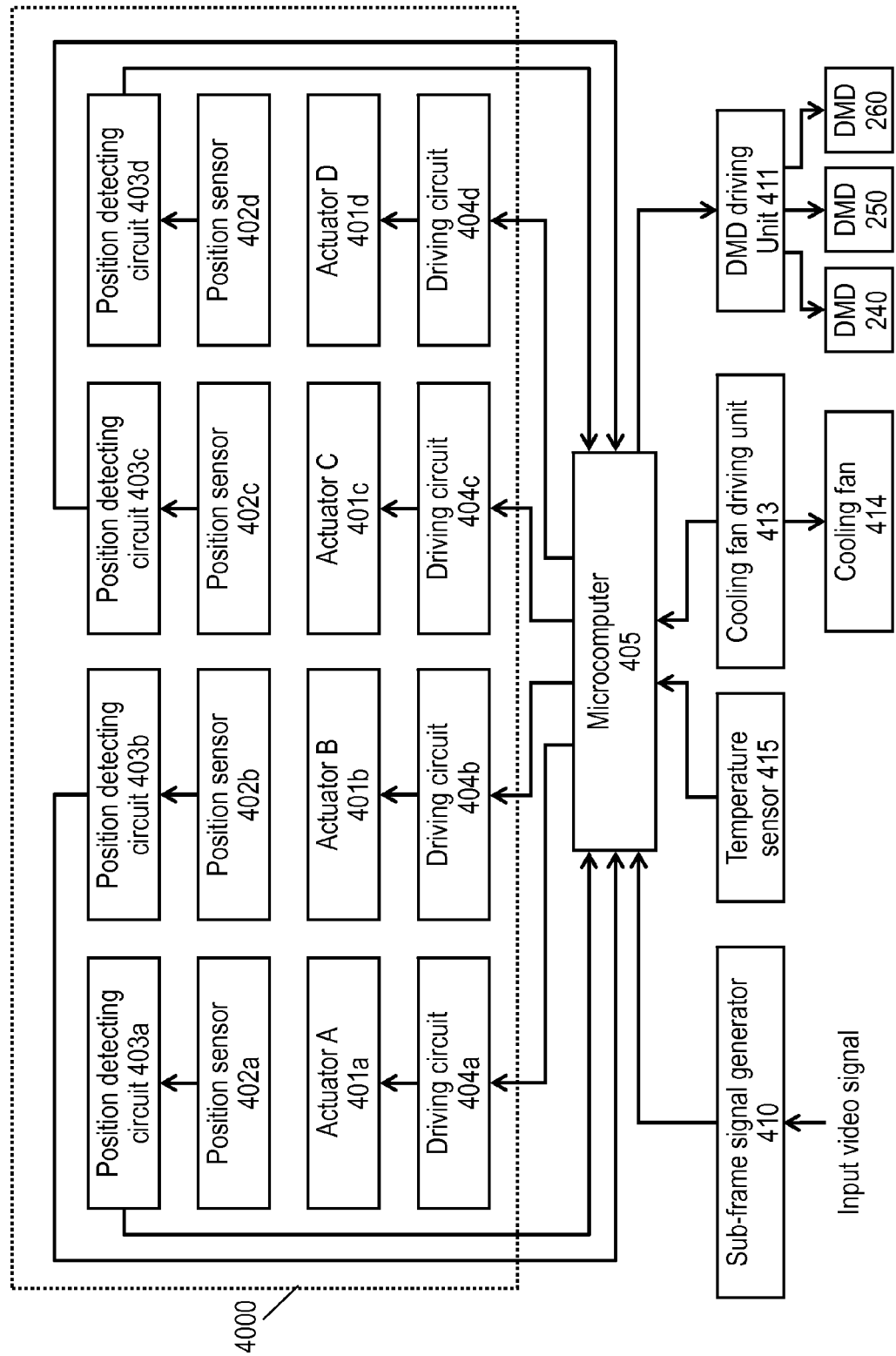
FIG. 2 is a block diagram illustrating an electric configuration of the projector of the first exemplary embodiment.
Figure 3:
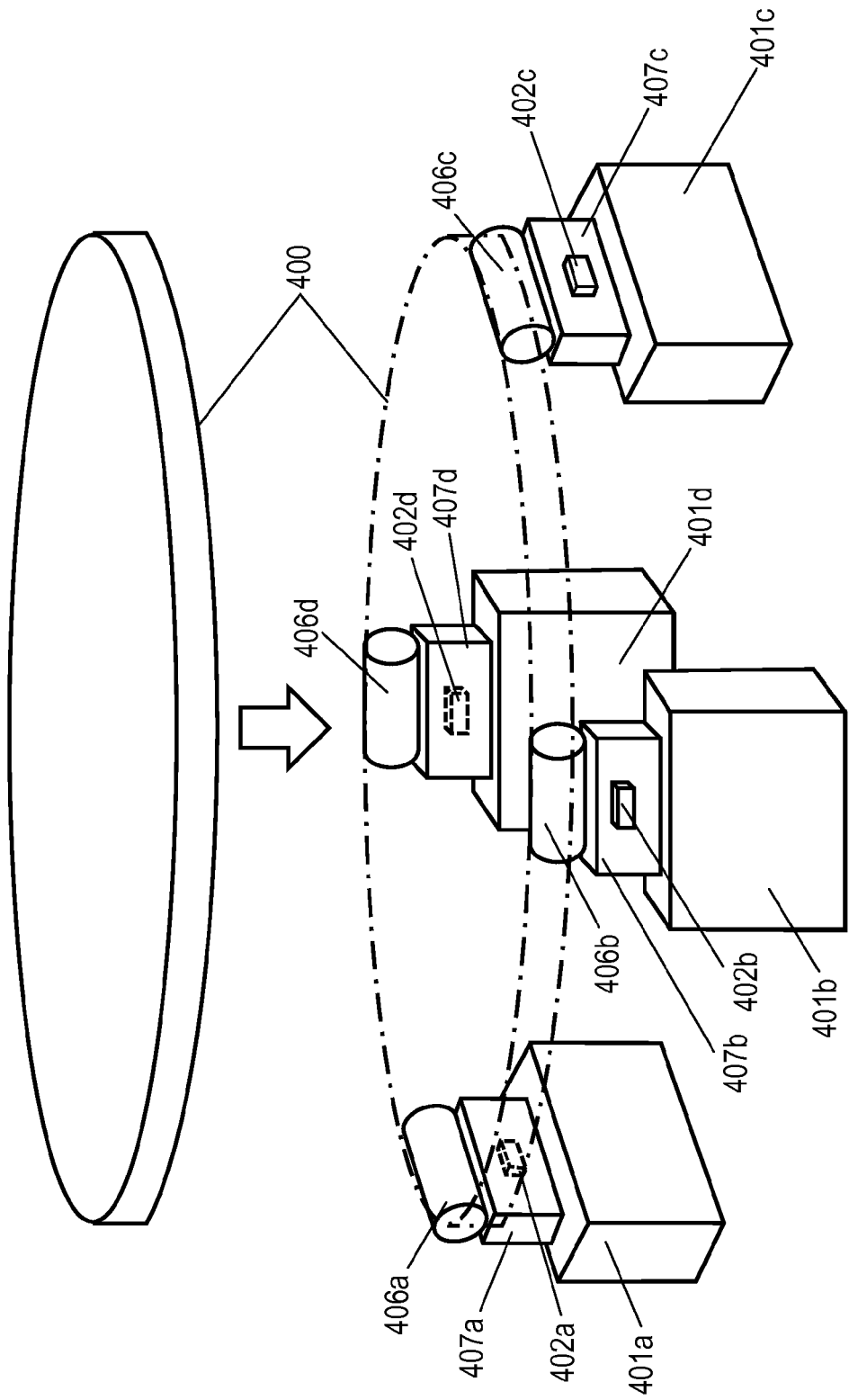
FIG. 3 is a view illustrating a schematic configuration of an optical element driving device of the first exemplary embodiment.

FIG. 2 is a block diagram illustrating an electric configuration of projector 100. FIG. 3 is a view illustrating a schematic configuration of optical element driving unit 4000.

In the first exemplary embodiment, plane parallel glass 400 having a circular shape is used as the optical element. End portions of plane parallel glass 400 are coupled to movable units 407a, 407b, 407c, and 407d of four actuators A401a, B401b, C401c, and D401d by coupling members 406a, 406b, 406c, and 406d, respectively.

Four actuators A401a, B401b, C401c, and D401d are driven by driving circuits 404a, 404b, 404c, and 404d that are controlled by a control signal of one microcomputer 405. Actuators A401a to D401d are driven by driving signal currents from driving circuits 404a to 404d such that movable units 407a to 407d proceed and retreat in a uniaxial direction.

The positions of movable units 407a to 407d are detected by position sensors 402a to 402d provided in movable units 407a to 407d, and position detecting circuits 403a to 403d. Detection signals of position detecting circuits 403a to 403d are input to microcomputer 405, microcomputer 405 always monitors the positions of movable units 407a to 407d of actuators A401a to D401d based on the detection signal and to perform servo control of actuators A401a to D401d.

The sub-frame video signal, which is obtained after the base video signal is processed by sub-frame signal generator 410, is input to microcomputer 405. Microcomputer 405 generates the synchronization signal supplied to driving circuits 404a to 404d based on the sub-frame video signal, and generates a DMD driving signal and the synchronization signal in order to control DMD driving unit 411.

Hereinafter, sometimes actuators A401a to D401d are simply referred to as actuator 401, movable units 407a to 407d are simply referred to as movable unit 407, position sensors 402a to 402d are simply referred to as position sensor 402, and coupling members 406a to 406d are simply referred to as coupling member 406.

Figure 4:
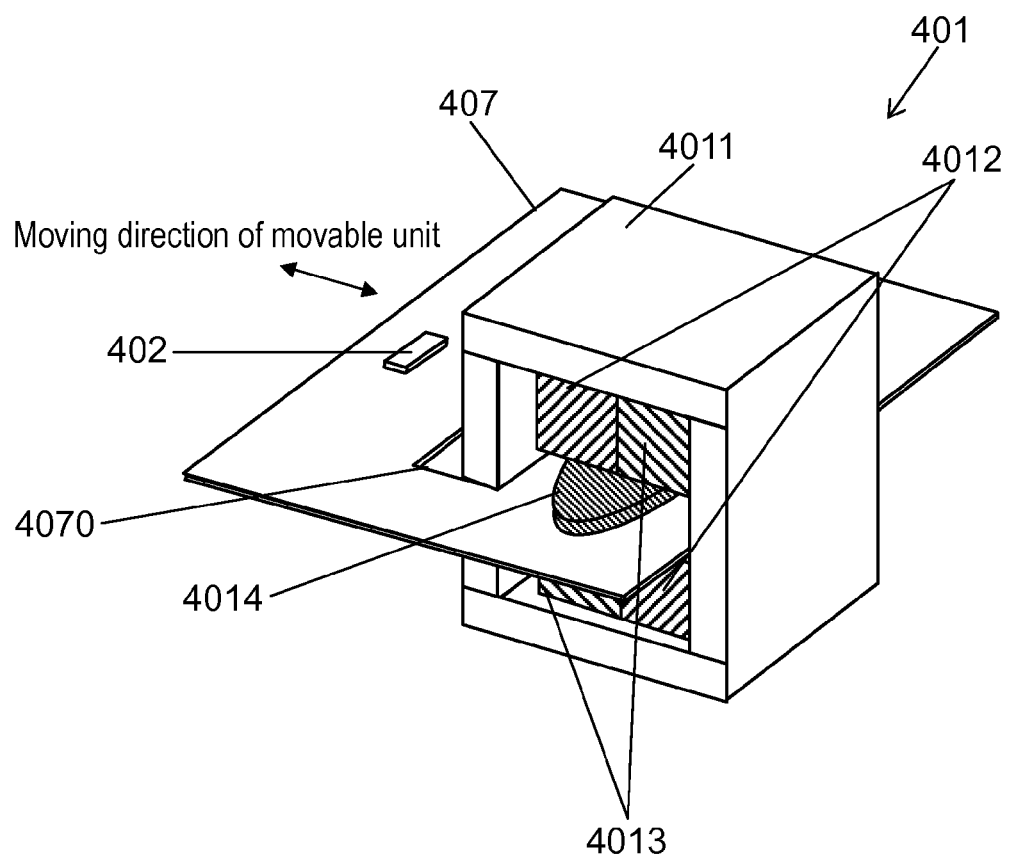
FIG. 4 is a view illustrating a configuration of each actuator in the optical element driving device of the first exemplary embodiment.

In the first exemplary embodiment, a Voice Coil Motor (VCM) is used as actuator 401. FIG. 4 is a view illustrating a structure of the VCM. Permanent magnets (N-pole permanent magnet 4012 and S-pole permanent magnet 4013) having different magnetic poles are arranged in square-shaped yoke 4011 with a certain distance so as to face each other. Movable unit 407 is arranged between permanent magnets 4012 and 4013 that are arranged so as to face each other.

Guide window 4070 is opened in movable unit 407, yoke 4011 is inserted in guide window 4070, and coil 4014 provided in movable unit 407 is arranged between permanent magnets 4012 and 4013 that are arranged so as to face each other. When the driving signal current is passed through coil 4014, movable unit 407 moves is a uniaxial that is an arrow direction. Movable unit 407 moves from a reference position in a positive or negative direction according to the driving signal current passed through coil 4014. A moving amount of movable unit 407 is detected by position sensor 402 attached to movable unit 407. Position sensor 402 is a Hall element that detects a magnetic field generated by the permanent magnet. A potential difference is generated at both ends of position sensor 402 according to the detected magnetic field. Position detecting circuits 403a to 403d in FIG. 2 detect the potential difference, whereby a relative distance between movable unit 407 and the permanent magnet is detected as the moving amount. A gap is slightly generated between movable unit 407 to which coil 4014 is attached and permanent magnets 4012 and 4013. Even if a force is applied in the direction perpendicular to the uniaxial direction in which movable unit 407 is driven by the driving signal current, movable unit 407 can be displaced by a permitted distance of the slight gap, and movable unit 407 can be inclined.

Figure 5:
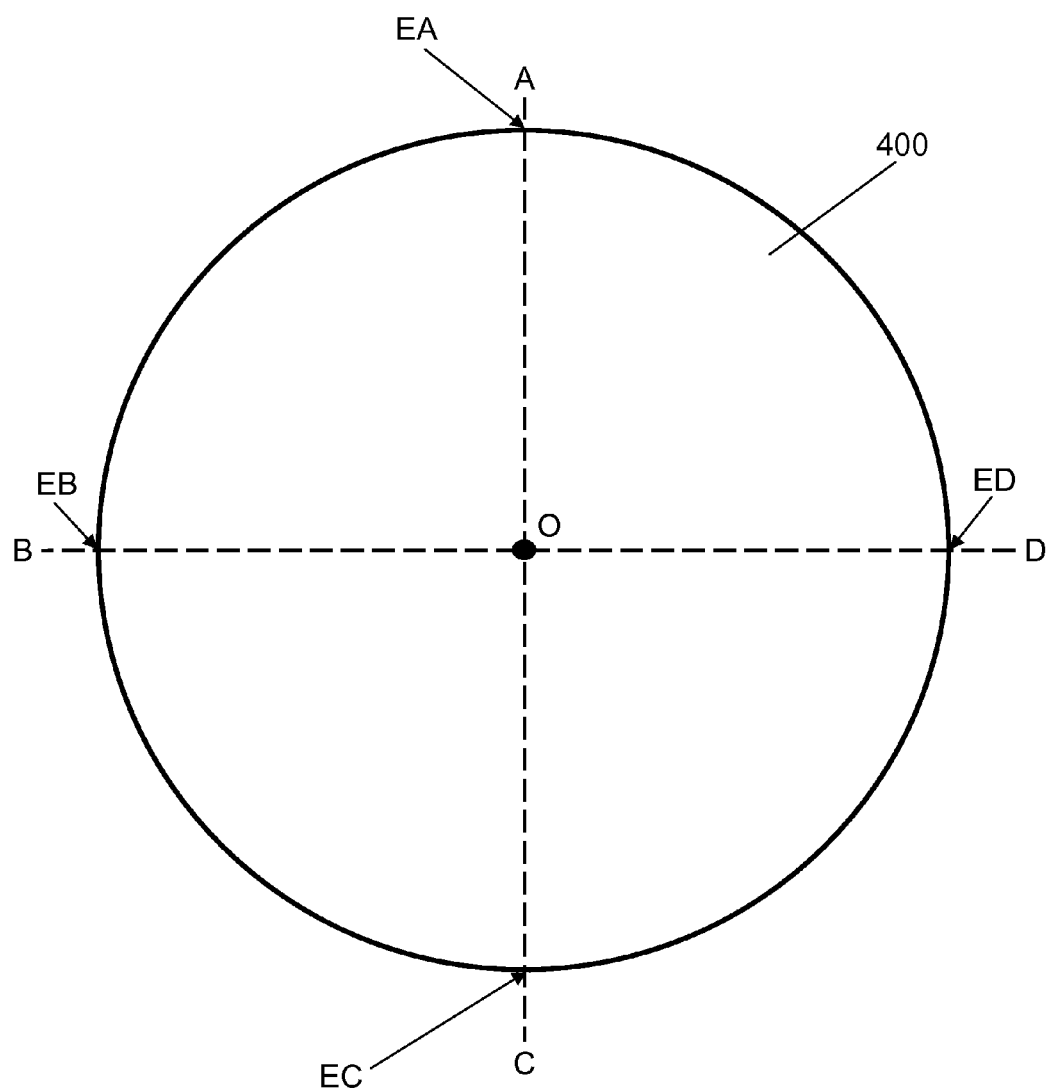
FIG. 5 is a plan view illustrating a plane parallel glass of the first exemplary embodiment.

FIG. 5 is a plan view of plane parallel glass 400. As illustrated in FIG. 5, coupling member 406 to which movable unit 407 of actuator 401 is connected is coupled to end portions EA, EB, EC, and ED at end portions EA, EB, EC, and ED on A-C and B-D axes, which are orthogonal to each other in a surface center O of plane parallel glass 400. End portions EA, EB, EC, and ED are swingably coupled to movable unit 407 of actuator 401 by coupling member 406. By driving actuators A401a to D401d, plane parallel glass 400 is biaxially swung while the position of the surface center O is held constant.

[1-2. Operation]

An operation of projector 100 of the first exemplary embodiment having the above configuration will be described below.

[1-2-1. Operation of Optical Element Driving Unit]

Figure 6:
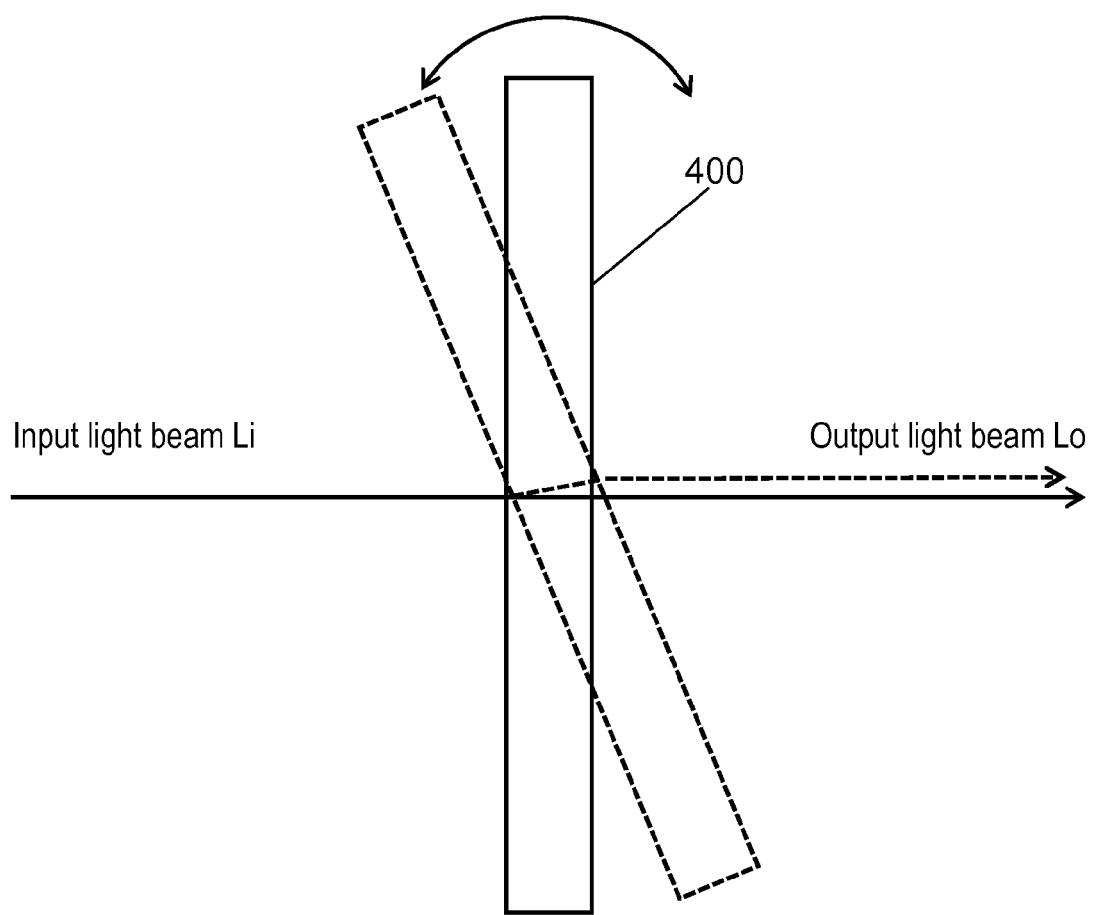
FIG. 6 is a view illustrating a principle of an optical path change of the plane parallel glass.

An operation of optical element driving unit 4000 will be described below. FIG. 6 is a view illustrating a principle of an optical path change of plane parallel glass 400. As illustrated in FIG. 6, when the surface of plane parallel glass 400 is orthogonal to input light beam Li, input light beam Li travels straight without refraction at an interface between plane parallel glass 400 and air. At the interface from which input light beam Li exits to air through plane parallel glass 400, plane parallel glass 400 has the planes parallel to each other, and the light beam is orthogonal to the interface. Therefore, the light beam travels straight without refraction. For this reason, the movement of the video image is not generated in the case that input light beam Li is the video light beam.

On the other hand, as illustrated by a broken line in FIG. 6, when the surface of plane parallel glass 400 is not orthogonal to input light beam Li, input light beam Li is refracted at the interface between plane parallel glass 400 and air. After input light beam Li is incident on plane parallel glass 400 while refracted, input light beam Li exits to air at the interface through plane parallel glass 400. At this point, the light beam is also refracted because the light beam is not orthogonal to the interface.

Because plane parallel glass 400 has the planes parallel to each other, an angle at which the light beam is refracted when being incident on plane parallel glass 400 is equal to an angle at which the light beam is refracted when exiting from plane parallel glass 400. In the case that input light beam Li is the video light beam, the video light beam of output light beam Lo is translated in an inclination direction of plane parallel glass 400. As a result, the display position of the video image that is output from plane parallel glass 400 and projected moves.

Figure 7:
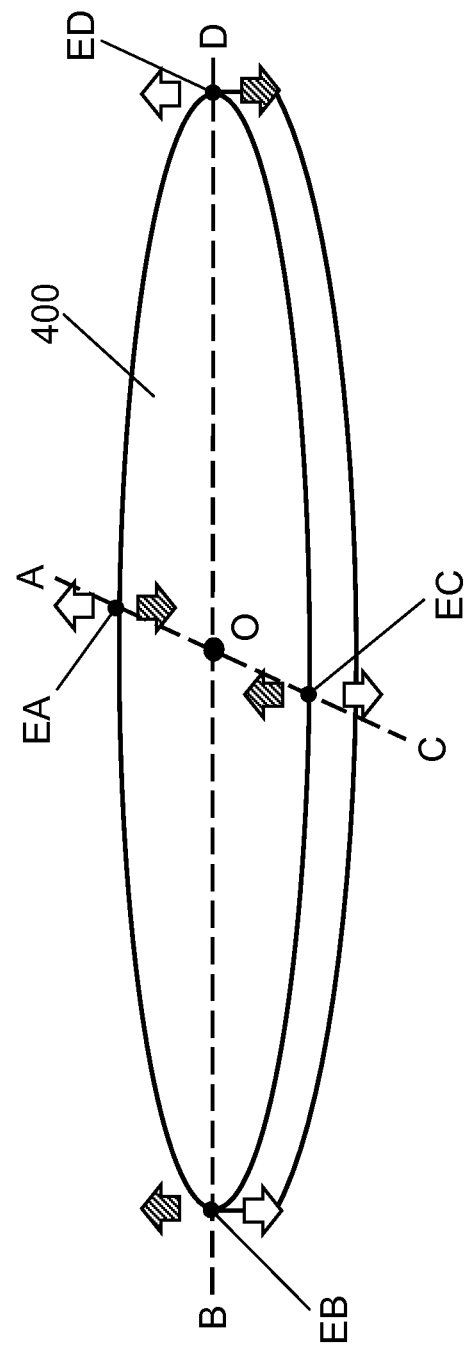
FIG. 7 is a view illustrating motion of the plane parallel glass of the first exemplary embodiment.

FIG. 7 is a view illustrating motion of plane parallel glass 400. In FIG. 7, for example, with the B-D axis as a rotation center, end portion EA is moved upward by a predetermined amount, and end portion EC is moved downward by a predetermined amount. At the same time, with the A-C axis as a rotation center, end portion EB is moved downward by a predetermined amount, and end portion ED is moved upward by a predetermined amount. Therefore, the optical path of the video light beam incident on the glass plate is changed, and the pixel is displayed at a predetermined position. A pixel shift moving the display position of the pixel can be performed from this situation by similarly controlling end portions EA, EB, EC, and ED in the vertical direction.

Sub-frame signal generator 410 generates four sub-frame video signals corresponding to the projection position movement performed by plane parallel glass 400 and actuators A401a to D401d in each frame of the input video signal. The number of pixels of the sub-frame video signal is equal to the corresponding number of pixels of each of DMDs 240, 250, and 260.

Microcomputer 405 transmits the four sub-frame video signals generated by sub-frame signal generator 410 to DMD driving unit 411. DMD driving unit 411 generates a DMD driving signal such that the four sub-frame video signals generated by sub-frame signal generator 410 are output at a rate four times an output frame rate that is a frame rate of the base video signal. Driving circuits 404a to 404d generate an actuator driving signal so as to drive actuators A401a to D401d to move a pixel projection position in synchronization with DMD driving unit 411.

At this point, in projector 100, DMDs 240, 250, and 260 can output the video signal having 1920 pixels in the horizontal direction and 1080 pixels in the vertical direction. Plane parallel glass 400 is driven by actuator 401, which allows the projection position to be deviated (shifted) by a half pixel in both the horizontal and vertical directions. As used herein, deviating the projection position by a half pixel means that the pixel is moved to the position of a half of a pitch between the pixels. The shift amount is set by a later-described method.

FIG. 8 is a schematic diagram illustrating the base video signal. The base video signal becomes a base when optical element driving unit 4000 of projector 100 generates the sub-frame video image. The base video signal is what is called a 4K2K video signal having 3840 pixels in the horizontal direction and 2160 pixels in the vertical direction. The number of pixels of the base video signal is four times that of the number of pixels in each of DMDs 240, 250, and 260. The base video signal may be a video signal that is directly input from an external device or a signal in which a lower-resolution input video image is up-converted in a system. A three-digit number indicated in each pixel of the base video signal in FIG. 8 means a coordinate of the sub-frame video signal.

Figure 9:
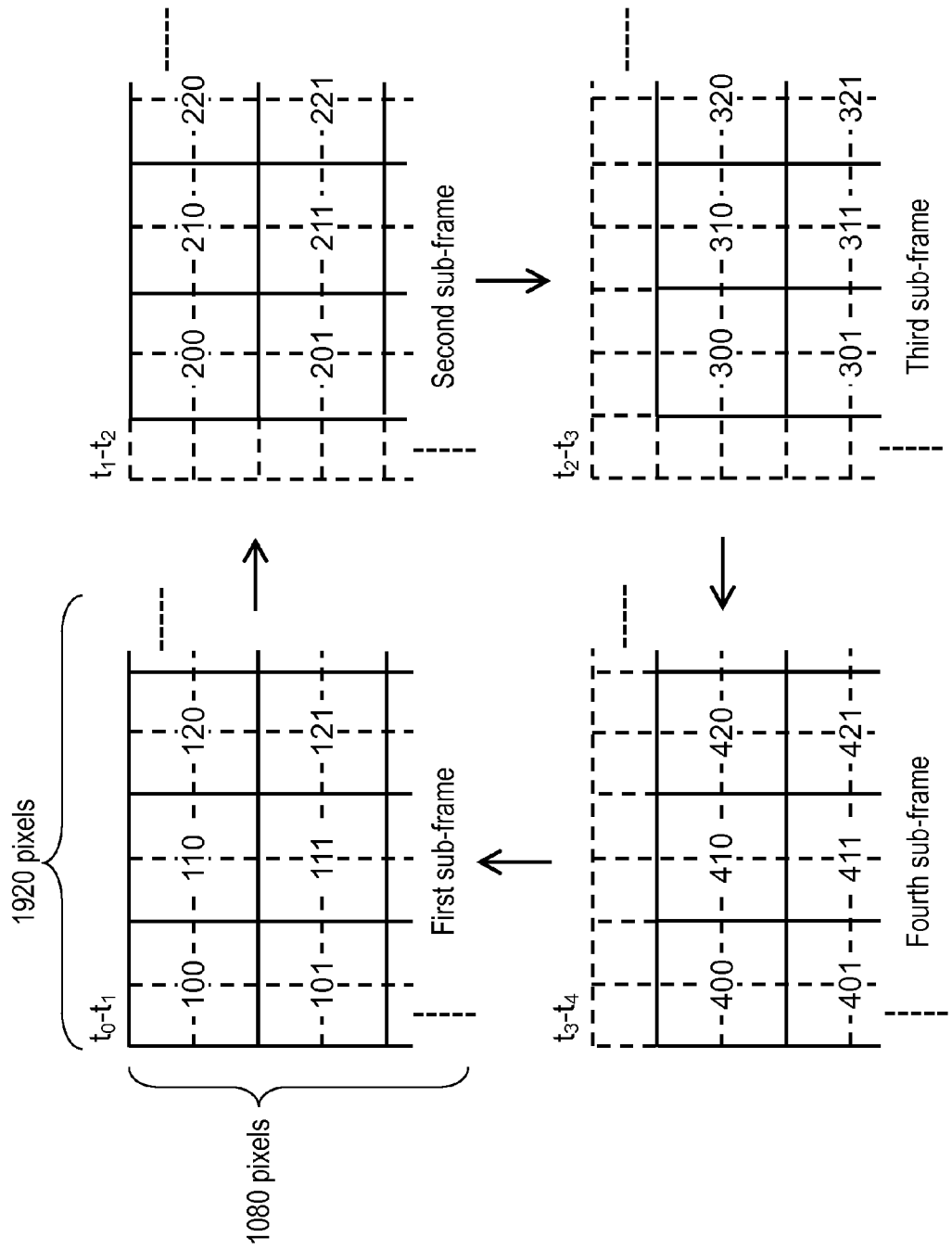
FIG. 9 is a view illustrating a sub-frame video signal.
Figure 10:
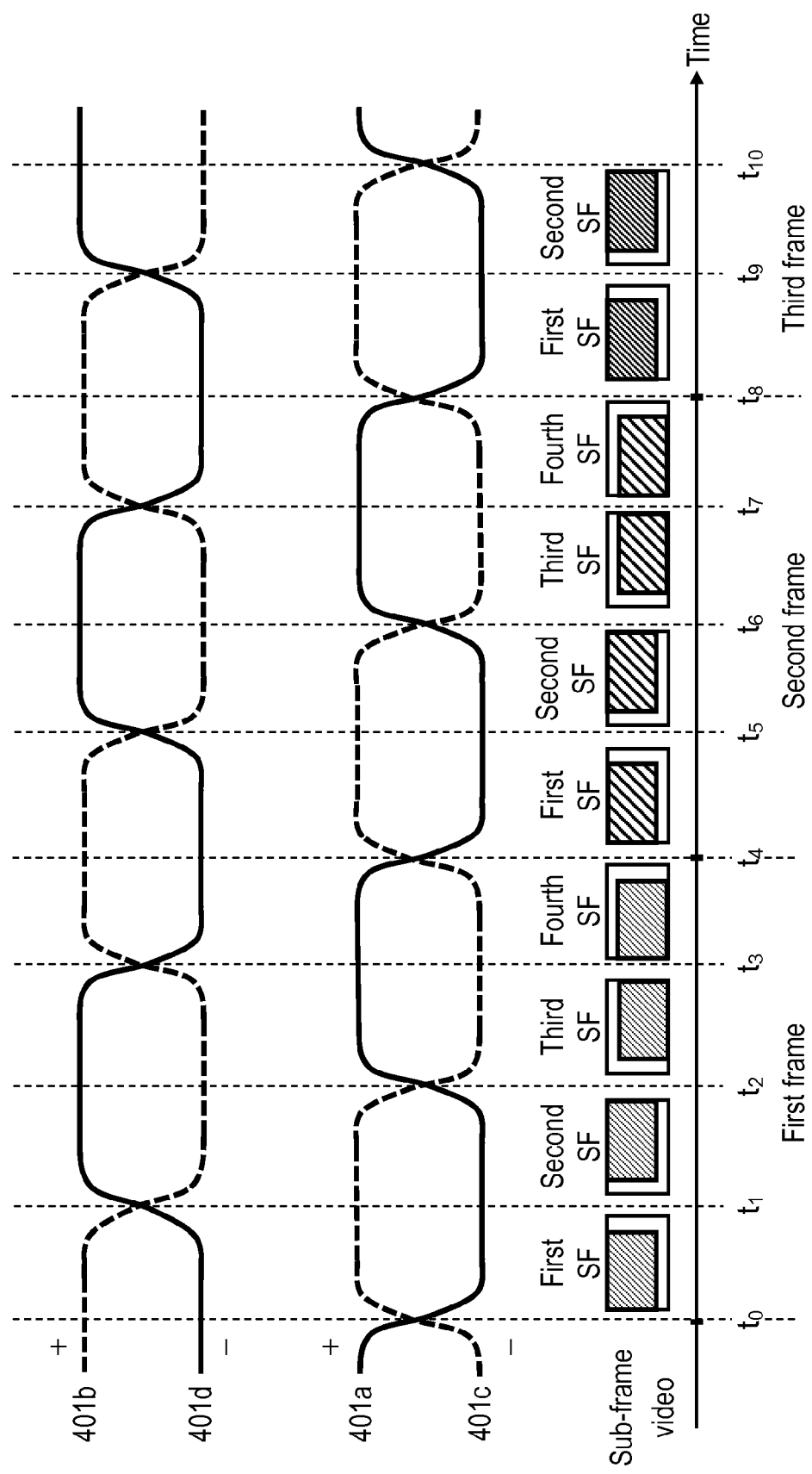
FIG. 10 is a view illustrating a state in which a sub-frame video image is shifted.

An operation of optical element driving unit 4000 will be described below. FIG. 9 is a view illustrating the sub-frame video signal generated from the base video signal. FIG. 10 is a view illustrating a state in which the sub-frame video image is shifted.

The sub-frame signal generating method of sub-frame signal generator 410 will be described. FIG. 9 illustrates how to sample the base video signal in FIG. 8 to generate the sub-frame video signal.

In the base video signal of FIG. 8,

1) It is assumed that a first sub-frame is a signal obtained by sampling the pixel, in which a remainder of 0 is calculated by dividing a numerical value indicating a number (column number) from 0 in the horizontal direction by 2 and the remainder of 0 is calculated by dividing a numerical value indicating a number (row number) from 0 in the vertical direction by 2.

2) It is assumed that a second sub-frame is a signal obtained by sampling the pixel, in which the remainder of 1 is calculated by dividing a numerical value indicating the number (column number) from 0 in the horizontal direction by 2 and a remainder of 0 is calculated by dividing a numerical value indicating a number (row number) from 0 in the vertical direction by 2.

3) It is assumed that a third sub-frame is a signal obtained by sampling the pixel, in which the remainder of 1 is calculated by dividing a numerical value indicating a number (column number) from 0 in the horizontal direction by 2 and the remainder of 1 is calculated by dividing a numerical value indicating a number (row number) from 0 in the vertical direction by 2.

4) It is assumed that a fourth sub-frame is a signal obtained by sampling the pixel, in which the remainder of 0 is calculated by dividing a numerical value indicating a number (column number) from 0 in the horizontal direction by 2 and the remainder of 1 is calculated by dividing a numerical value indicating a number (row number) from 0 in the vertical direction by 2.

DMDs 240, 250, and 260 output the four sub-frame video images at a rate four times the output frame rate. Specifically, assuming that the output frame rate is 60 Hz, the sub-frame video image is output at 240 Hz, and each actuator 401 is driven at 60 Hz.

FIG. 10 schematically illustrates states of the displacement (VCM displacement) of which the instruction is issued to each of actuators A401a to D401d and the movement of the sub-frame video image. The VCM displacement indicates a state of the displacement of each actuator 401 with an upward direction in FIG. 7 as a positive direction (+) and with a downward direction as a negative direction (−). For example, as illustrated in FIG. 10, in a period (of time of t0 and t1) of the first sub-frame of a first frame, the instruction of the displacement (−) is issued to actuator A401a, and the instruction of the displacement (+) is issued to actuator C401c. The instruction of the displacement (+) is issued to actuator B401b, and the instruction of the displacement (−) is issued to actuator D401d. Displacement waveforms of actuators A401a and C401c differ by 90 degrees from those of actuators B401b and D401d in a phase. Because plane parallel glass 400 is swung with the B-D and A-C axes as turning axes, the optical path of the input video light beam is displaced in the horizontal and vertical directions, and a first sub-frame video image (first SF), a second sub-frame video image (second SF), a third sub-frame video image (third SF), and a fourth sub-frame video image (fourth SF) are projected while deviated from one another by a half pixel. As illustrated in FIG. 9, in the period of time of t1 and t2, the second sub-frame video image is projected while deviated rightward by a half pixel with respect to the first sub-frame video image. In the period of time of t2 and t3, the third sub-frame video image is projected while deviated downward by a half pixel with respect to the second sub-frame video image. In the period of time of t3 and t4, the fourth sub-frame video image is projected while deviated leftward by a half pixel with respect to the third sub-frame video image.

[1-2-2. Control of Optical Element Driving Unit and Cooling Fan]

The control of optical element driving unit 4000 and cooling fan 414, which is performed by microcomputer 405, will be described below.

Temperature sensor 415 detects the temperature in projector 100. The detected temperature information is transmitted to microcomputer 405. Based on the transmitted temperature information, microcomputer 405 assigns the rotation speed R of cooling fan 414 to cooling fan driving unit 413 such that the temperature in projector 100 is kept within a proper range. Specifically, microcomputer 405 sets the rotation speed R of cooling fan 414 higher when the temperature information indicates a higher temperature. Cooling fan driving unit 413 adjusts a driving current such that cooling fan 414 is operated at the rotation speed R assigned by microcomputer 405. Therefore a temperature rise is suppressed in projector 100.

However, in the case that a difference between the rotation speed R of cooling fan 414 thus determined and a natural-number multiple of driving frequency F of actuator 401 falls within a given range, a vibration of the pixel having a frequency of the difference (natural-number multiple of driving frequency F of actuator 401—absolute value of the rotation speed R of cooling fan) possibly becomes prominent on the video display surface. It is considered that a video display disturbance caused by the pixel vibration is suppressed by a method for controlling the rotation speed R of cooling fan 414 or a method for controlling driving frequency F of actuator 401. The two methods will sequentially be described.

Figure 11:
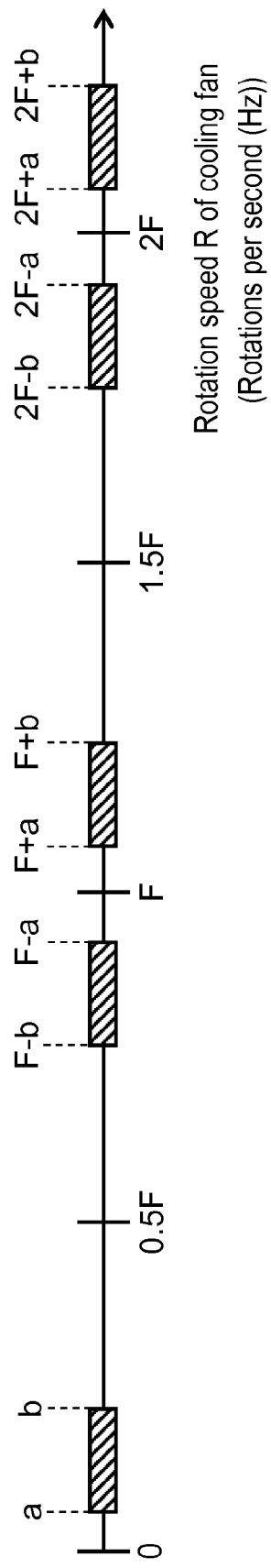
FIG. 11 is a view illustrating a relationship between a rotation speed of a cooling fan and a driving frequency of the actuator.

1) The Pixel Vibration Suppression by Controlling the Rotation Speed of the Cooling Fan Controlling the rotation speed R of cooling fan 414 will be described as a first method for suppressing the video display disturbance caused by the pixel vibration. FIG. 11 is a view illustrating a relationship between the rotation speed R of cooling fan 414 and driving frequency F of actuator 401. In FIG. 11, a horizontal axis indicates the rotation speed R of cooling fan 414. As illustrated in FIG. 11, microcomputer 405 controls the rotation speed R of cooling fan 414 while avoiding frequencies (hatching ranges) at which a viewer feels uncomfortable about the pixel vibration. Assuming that the frequency at which the viewer feels uncomfortable about the pixel vibration ranges from a to b, the rotation speed R of cooling fan 414, which is controlled while the uncomfortable frequency is avoided, can be expressed from a relationship with driving frequency F of actuator 401 using the following expressions (1) and (2). That is, cooling fan 414 is controlled by the rotation speed R satisfying the expression (1) or (2).

$$n \times F - a < R < n \times F + a \quad (1)$$

$$n \times F + b < R < (n+1) \times F - b \quad (2)$$

At this point, it is necessary that an integral number n be greater than or equal to 0, and that a value of frequency b be less than $F \times 0.5$.

In other words, the rotation speed R of cooling fan 414 is controlled while the range where the rotation speed R exists between ($F \times n2 - b$) and ($F \times n2 - a$) and between ($F \times n2 + a$) and ($F \times n2 + b$) is avoided, which allows the suppression of the video display disturbance caused by the pixel vibration.

As to the frequency of the uncomfortable pixel vibration, generally a is set to 4 Hz and b is set to 12.5 Hz. For example, in the case that actuator 401 has driving frequency F of 60 Hz, microcomputer 405 sets the rotation speed R to cooling fan driving unit 413 such that the rotation speed R of cooling fan 414 does not exist at the following frequencies from the expressions (1) and (2).

Between 47.5 (=60−12.5) Hz and 56 (=60−4) Hz,
between 64 (=60+4) Hz and 72.5 (=60+12.5) Hz,
between 107.5 (=60×2−12.5) Hz and 116 (=60×2−4) Hz,
between 124 (=60×2+4) Hz and 132.5 (=60×2+12.5) Hz,
... (The rest is omitted)

2) The Pixel Vibration Suppression by Controlling the Driving Frequency of the Actuator Controlling driving frequency F of actuator 401 will be described as a second method for suppressing the video display disturbance caused by the pixel vibration.

As illustrated in FIG. 10, driving frequency F of actuator 401 is synchronized with the output frame rate. Therefore, desirably driving frequency F of actuator 401 becomes a natural-number multiple of the output frame rate in the case that driving frequency F of actuator 401 is changed. Specifically, the rotation speed R of cooling fan 414 is set to 60 Hz, the output frame rate is set to 60 Hz, and driving frequency F of actuator 401 is set to 120 Hz that is double the output frame rate. At this point, the rotation speed R of cooling fan 414 does not become a natural-number multiple but a half of driving frequency F of actuator 401. Accordingly, the pixel vibration is hardly visible.

For example, in the case that actuator 401 has driving frequency F of 120 Hz, assuming that the frequency at which the viewer feels uncomfortable about the pixel vibration ranges from a of 4 Hz to b of 12.5 Hz similarly to "1) the pixel vibration suppression by controlling the rotation speed of the cooling fan", the video display disturbance caused by the pixel vibration becomes prominent when the rotation speed R of cooling fan 414 exists in the following ranges.

Between 107.5 (=120−12.5) Hz and 116 (=120−4) Hz,
between 124 (=120+4) Hz and 132.5 (=120+12.5) Hz,
between 227.5 (=120×2−12.5) Hz and 236 (=120×2−4) Hz,
between 244 (=120×2+4) Hz and 252.5 (=120×2+12.5) Hz, and
... (The rest is omitted)

Figure 12:
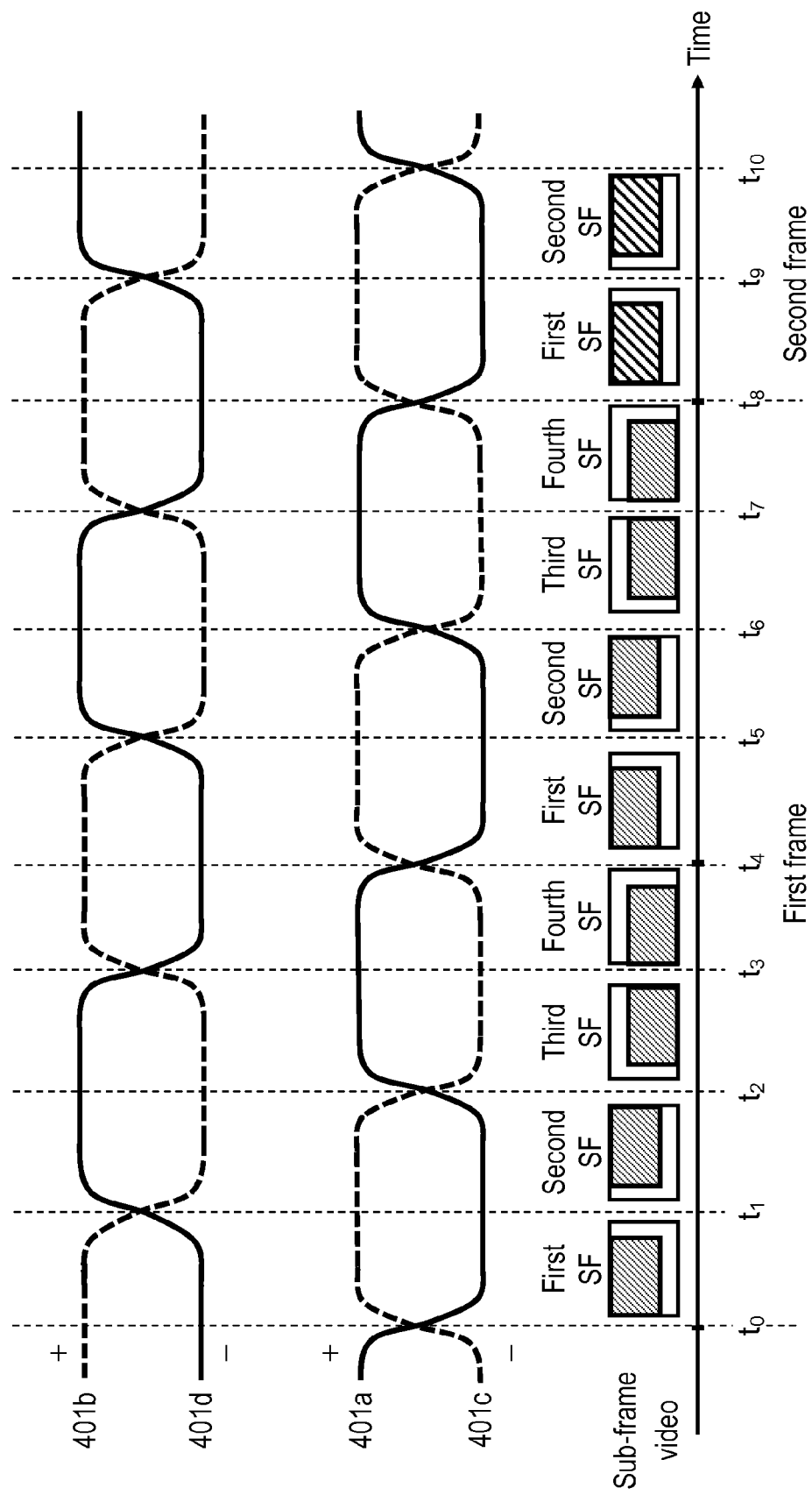
FIG. 12 is a view illustrating a state in which the sub-frame video image is shifted so as to become a double-density image.

When compared with the case of actuator 401 having driving frequency F of 120 Hz described in "1) the pixel vibration suppression by controlling the rotation speed of the cooling fan", for example, the rotation speed in the ranges between 47.5 Hz and 56 Hz and between 64 Hz and 72.5 Hz do not become the frequency at which the uncomfortable pixel vibration becomes prominent. That is, when compared with the case of actuator 401 having driving frequency F of 120 Hz, the range of the frequency at which the uncomfortable pixel vibration becomes prominent becomes a half, and the pixel vibration is hardly visible. However, at this point, because a moving speed of the projection position becomes double, as illustrated in FIG. 12, the first sub-frame, the second sub-frame, the third sub-frame, and the fourth sub-frame are sequentially displayed twice at one frame interval in synchronization with the drive of actuator 401.

In this case, in combination with the control of the rotation speed R of cooling fan 414 described in "1) the pixel vibration suppression by controlling the rotation speed of the cooling fan", microcomputer 405 may set the rotation speed R to cooling fan driving unit 413 such that the rotation speed R of cooling fan 414 does not become the frequency at which the uncomfortable pixel vibration becomes prominent.

[1-2-3. Effect and Others]

As described above, projector 100 of the first exemplary embodiment includes: sub-frame signal generator 410 that converts the input base video signal having a first number of pixels and a first frame rate (frames per second) into the sub-frame video signal having a second number of pixels and a second frame rate (frames per second), the second number of pixels being smaller than the first number of pixels, and the second frame rate being an n-th multiple (n is an integer of 2 or greater) of the first frame rate; DMDs 240, 250, and 260 each of which modulates the light beam emitted from light source 130 based on the sub-frame video signal and outputs the video light beam; plane parallel glass 400 that displaces the optical axis of the video light beam output from each of DMDs 240, 250, and 260; optical element driving unit 4000 that drives plane parallel glass 400 at frequency F (Hz) based on timing of displaying the sub-frame video signal, frequency F being a natural-number multiple of the first frame rate; projection optical system 300 that projects the video light beam displaced by plane parallel glass 400 to the projection surface; and cooling fan 414 that rotates at the rotation speed R (rotations per second). The rotation speed R is set so as to become a value within a predetermined range corresponding to frequency F.

Accordingly, the difference between the natural-number multiple of driving frequency F of plane parallel glass 400 driven by optical element driving unit 4000 and the rotation speed R of cooling fan 414 is set to a value avoiding the frequency at which generally the viewer feels uncomfortable. Therefore, the uncomfortable feeling caused by the video display disturbance can be reduced. That is, in projector 100, the quality of the projection video image can be maintained by the configuration.

Other Exemplary Embodiments

By way of example, the first exemplary embodiment is described above as the technology disclosed in the present disclosure. However, the technology disclosed in the present disclosure is not limited to the first exemplary embodiment, but can be applied to exemplary embodiments in which modifications, replacements, additions, and omission are performed. A new exemplary embodiment can be made by a combination of constituents described in the first exemplary embodiment.

Other exemplary embodiments will be described below.

In the first exemplary embodiment, DMDs 240, 250, and 260 are described as an example of the light bulb. The light bulb may modulate the light beam emitted from light source 130 based on the sub-frame video signal, and output the video light beam. Accordingly, the light bulb is not limited to DMDs 240, 250, and 260. For example, a reflection or transmission liquid crystal panel may be used as the light bulb.

In the configuration of the first exemplary embodiment, the sub-frame video signal is generated such that the number of pixels becomes a quarter of that of the base video signal, and such that the frame rate becomes four times that of the base video signal. With respect to the input base video signal having a first number of pixels and a first frame rate (frame/s), the sub-frame video signal may have a second number of pixels smaller than the first number of pixels and a second frame rate (frame/s) that is an n-th multiple (n is an integer of 2 or greater) of the first frame rate. For example, the sub-frame video signal may be generated such that the number of pixels becomes a quarter of that of the base video signal, and such that the frame rate becomes double that of the base video signal.

In the first exemplary embodiment, by driving four actuators A401a to D401d, plane parallel glass 400 is biaxially swung while the position of surface center O is held constant. However, the disclosure is not limited to this. Alternatively, for example, by driving two actuators A401a and C401c, plane parallel glass 400 may uniaxially be swung while the B-D axis is held constant. In this case, the sub-frame video signal may be generated such that the number of pixels becomes a half of that of the base video signal, and such that the frame rate becomes double that of the base video signal.

In the first exemplary embodiment, cooling fan 414 is described as an example of the rotating body. It is only necessary to set the rotation speed R so as to become a value within a predetermined range corresponding to driving frequency F of actuator 401. Accordingly, the rotating body is not limited to cooling fan 414.

The present disclosure can be applied to the projection video display apparatus that shifts the pixel display position to show the fine projection video image.

What is claimed is:

1. A projection video display apparatus comprising:
   a converter that converts an input video signal having a first number of pixels and a first frame rate (frames per second) into a conversion video signal having a second number of pixels and a second frame rate (frames per second), the second number of pixels being smaller than the first number of pixels, and the second frame rate being an n-th multiple (n is an integer of 2 or greater) of the first frame rate;
   a light source;
   a light bulb that modulates a light beam emitted from the light source based on the conversion video signal and outputs a video light beam;
   an optical element that displaces an optical axis of the video light beam output from the light bulb;
   an optical element driving unit that drives the optical element at a frequency F (Hz) based on timing of displaying the conversion video signal, the frequency F being a natural-number multiple of the first frame rate;
   a projection optical system that projects the video light beam displaced by the optical element to a projection surface; and
   a rotating body that rotates at a rotation speed R (rotations per second),
   wherein the rotation speed R is set so as to become a value within a predetermined range corresponding to the frequency F.

2. The projection video display apparatus according to claim 1, wherein the rotating body is a fan that sends air to at least one of the light source and the light bulb.

3. The projection video display apparatus according to claim 1, further comprising a controller that sets at least one of the frequency F and the rotation speed R such that the rotation speed R becomes the value within the predetermined range corresponding to the frequency F.

4. The projection video display apparatus according to claim 3, wherein the controller sets the frequency R such that the following condition is satisfied, $$m \times F - a < R < m \times F + a, \text{ or}$$

$$m \times F + b < R < (m+1) \times F - b,$$

where $R > 0$, m is an integer of 0 or greater, and $0 < a < b < F/2$.

* * * * *